United States Patent
Chon et al.

(10) Patent No.: US 9,955,186 B2
(45) Date of Patent: Apr. 24, 2018

(54) BLOCK SIZE DECISION FOR VIDEO CODING

(71) Applicant: QUALCOMM Incorporated, San Diego, CA (US)

(72) Inventors: Jaehong Chon, San Diego, CA (US);
In Suk Chong, San Diego, CA (US);
Xianglin Wang, San Diego, CA (US);
Cheng-Teh Hsieh, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 235 days.

(21) Appl. No.: 14/992,820

(22) Filed: Jan. 11, 2016

(65) Prior Publication Data
US 2017/0201769 A1    Jul. 13, 2017

(51) Int. Cl.
| | |
|---|---|
| *H04N 7/12* | (2006.01) |
| *G06K 9/36* | (2006.01) |
| *H04N 19/593* | (2014.01) |
| *H04N 19/119* | (2014.01) |
| *H04N 19/147* | (2014.01) |
| *H04N 19/11* | (2014.01) |
| *H04N 19/14* | (2014.01) |

(52) U.S. Cl.
CPC .......... *H04N 19/593* (2014.11); *H04N 19/11* (2014.11); *H04N 19/119* (2014.11); *H04N 19/14* (2014.11); *H04N 19/147* (2014.11)

(58) Field of Classification Search
CPC ...... H04N 19/11; H04N 19/14; H04N 19/147; H04N 19/593
See application file for complete search history.

(56) References Cited

U.S. PATENT DOCUMENTS

| | | | |
|---|---|---|---|
| 9,392,272 B1* | 7/2016 | Wang | H04N 19/00157 |
| 9,591,313 B2* | 3/2017 | Li | H04N 19/149 |

(Continued)

FOREIGN PATENT DOCUMENTS

| | | |
|---|---|---|
| EP | 1610563 A2 | 12/2005 |
| EP | 2073557 A1 | 6/2009 |

OTHER PUBLICATIONS

Response to Written Opinion from corresponding PCT Application Serial No. PCT/US2016/063155 dated May 11, 2017, (22 pages).

(Continued)

*Primary Examiner* — Tsion B Owens
(74) *Attorney, Agent, or Firm* — Shumaker & Sieffert, P.A.

(57) ABSTRACT

An example method includes determining a respective variance value for pixels of each respective sub-block of at least four sub-blocks of a current block of video data of a particular block size; determining an average of the determined variance values for the at least four sub-blocks; determining a maximum difference value for the current block based on the average and the variance values for the at least four sub-blocks; determining whether pixels of the current block are homogeneous based on whether the maximum difference value for the current block satisfies a threshold difference value; and in response to determining that the pixels of the current block are homogeneous, selectively including block sizes that are greater than or equal to a threshold block size in a sub-set of block sizes to evaluate for use when intra encoding the pixels of the current block.

20 Claims, 7 Drawing Sheets

(56) References Cited

U.S. PATENT DOCUMENTS

| | | | |
|---|---|---|---|
| 2005/0286630 A1* | 12/2005 | Tong | H04N 19/00 |
| | | | 375/240.03 |
| 2007/0140337 A1 | 6/2007 | Lim et al. | |
| 2010/0020872 A1* | 1/2010 | Shimizu | H04N 19/196 |
| | | | 375/240.12 |
| 2011/0002385 A1 | 1/2011 | Kobayashi | |
| 2011/0292998 A1* | 12/2011 | Ohgose | H04N 19/176 |
| | | | 375/240.08 |
| 2013/0089143 A1 | 4/2013 | Siddaramanna et al. | |
| 2015/0055698 A1 | 2/2015 | Na et al. | |
| 2016/0373740 A1* | 12/2016 | Nagumo | H04N 19/503 |
| 2017/0034512 A1* | 2/2017 | Casula | H04N 19/176 |

OTHER PUBLICATIONS

Wiegand et al., "WD1: Working Draft 1 of High-Efficiency Video Coding", JCTVC-C403, 3rd Meeting: Guangzhou, CN, Oct. 7-15, 2010, (Joint Collaborative Team on Video Coding of ISO/IEC JTC1/SC29/WG11 and ITU-T SG.16); Jan. 6, 2011, 137 pp.

Wiegand et al., "WD2: Working Draft 2 of High-Efficiency Video Coding," JCTVC-D503, 4th Meeting: Daegu, KR, Jan. 20-28, 2011, (Joint Collaborative Team on Video Coding of ISO/IEC JTC1/SC29/WG11 and ITU-T SG.16); Apr. 15, 2011, 153 pp.

Wiegand et al., "WD3: Working Draft 3 of High-Efficiency Video Coding," Document JCTVC-E603, 5th Meeting: Geneva, CH, Mar. 16-23, 2011,(Joint Collaborative Team on Video Coding of ISO/IEC JTC1/SC29/WG11 and ITU-T SG.16); May 9, 2015, 193 pp.

Bross et al., "WD4: Working Draft 4 of High-Efficiency Video Coding," 6th Meeting: Torino, IT, Jul. 14-22, 2011, (Joint Collaborative Team on Video Coding of ISO/IEC JTC1/SC29/WG11 and ITU-T SG.16);JCTVC-F803_d2, Oct. 4, 2011, 226 pp.

Bross et al., "WD5: Working Draft 5 of High-Efficiency Video Coding," 7th Meeting: Geneva, Switzerland, Nov. 21-30, 2011, (Joint Collaborative Team on Video Coding of ISO/IEC JTC1/SC29/WG11 and ITU-T SG.16);JCTVC-G1103_d2, Dec. 30, 2011, 214 pp.

Bross et al., "High efficiency video coding (HEVC) text specification draft 6," 8th Meeting: San Jose, CA, USA, Feb. 1-10, 2012, (Joint Collaborative Team on Video Coding of ISO/IEC JTC1/SC29/WG11 and ITU-T SG.16); JCTVC-H1003, Apr. 2, 2012, 259 pp.

Bross et al., "High efficiency video coding (HEVC) text specification draft 7," 9th Meeting: Geneva, CH, Apr. 27-May 7, 2012, (Joint Collaborative Team on Video Coding of ISO/IEC JTC1/SC29/WG11 and ITU-T SG.16); JCTVC-I1003_d2, Jun. 1, 2012, 290 pp.

Bross et al., "High efficiency video coding (HEVC) text specification draft 8," 10th Meeting: Stockholm, SE, Jul. 11-20, 2012, (Joint Collaborative Team on Video Coding of ISO/IEC JTC1/SC29/WG11 and ITU-T SG.16); JCTVC-J1003_d7, Jul. 28, 2012, 261 pp.

Bross et al., "High efficiency video coding (HEVC) text specification draft 9," 11th Meeting: Shanghai, CN, Oct. 10-19, 2012, (Joint Collaborative Team on Video Coding of ISO/IEC JTC1/SC29/WG11 and ITU-T SG.16); JCTVC-K1003_v7, Nov. 2, 2012, 290 pp.

Bross et al., "High efficiency video coding (HEVC) text specification draft 10 (for FDIS & Last Call)," 12th Meeting: Geneva, CH, Jan. 14-23, 2013, (Joint Collaborative Team on Video Coding of ISO/IEC JTC1/SC29/WG11 and ITU-T SG.16); JCTVC-L1003_v34, Mar. 19, 2013, 310 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

He et al., "A Fast Intra-Frame Prediction Algorithm Based on The Characteristic of Macro-Block and 2D-Histogram for H.264/AVC Standard", Intelligent Information Hiding and Multimedia Signal Processing, 2007, IIHMSP 2007, Third International Conference on IEEE, Piscataway, NJ, USA, XP031233826, Nov. 26, 2007, 4 pp.

International Search Report and Written Opinion from International Application No. PCT/US2016/063155, dated Feb. 23, 2017, 15 pp.

Li et al., "Prediction Unit Depth Selection Based on Statistic Distribution for HEVC Intra Coding", 2013, IEEE International Conference on Multimedia and Expo (ICME), IEEE, XP032639315, Jul. 14, 2014, 6 pp.

Second Written Opinion from corresponding PCT Application Serial No. PCT/US2016/063155 dated Nov. 22, 2017 (5 pages).

* cited by examiner

BLOCK SIZE DECISION FOR VIDEO CODING

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), ITU-T H.265, High Efficiency Video Coding (HEVC), and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video picture or a portion of a video picture) may be partitioned into video blocks, which may also be referred to as treeblocks, coding units (CUs), and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized.

SUMMARY

In one example, a method for encoding video data includes determining, by a video encoder, a respective variance value for pixels of each respective sub-block of at least four sub-blocks of a current block of video data of a particular block size of a plurality of block sizes; determining, by the video encoder, an average of the determined variance values for the at least four sub-blocks; determining, by the video encoder, a maximum difference value for the current block based on the determined average and the determined variance values for the at least four sub-blocks; determining, by the video encoder, whether pixels of the current block are homogeneous based on whether the maximum difference value for the current block satisfies a threshold difference value; in response to determining that the pixels of the current block are homogeneous, selectively including, by the video encoder, block sizes of the plurality of block sizes that are greater than or equal to a threshold block size of the plurality of block sizes in a sub-set of block sizes to evaluate for use when intra encoding the pixels of the current block; and evaluating block sizes in the sub-set of block sizes for use when intra encoding the pixels of the current block.

In another example, a video encoding device includes a memory configured to store a current block of video data; and one or more processors. In this example, the one or more processors are configured to: determine a respective variance value for pixels of each respective sub-block of at least four sub-blocks of the current block of video data of a particular block size of a plurality of block sizes; determine an average of the determined variance values for the at least four sub-blocks; determine a maximum difference value for the current block based on the determined average and the determined variance values for the at least four sub-blocks; determine whether pixels of the current block are homogeneous based on whether the maximum difference value for the current block satisfies a threshold difference value; selectively include, in response to determining that the pixels of the current block are homogeneous, block sizes of the plurality of block sizes that are greater than or equal to a threshold block size of the plurality of block sizes in a sub-set of block sizes to evaluate for use when intra encoding the pixels of the current block; and evaluate block sizes in the sub-set of block sizes for use when intra encoding the pixels of the current block.

In another example, a video encoding device includes means for determining a respective variance value for pixels of each respective sub-block of at least four sub-blocks of a current block of video data of a particular block size of a plurality of block sizes; means for determining an average of the determined variance values for the at least four sub-blocks; means for determining a maximum difference value for the current block based on the determined average and the determined variance values for the at least four sub-blocks; means for determining whether pixels of the current block are homogeneous based on whether the maximum difference value for the current block satisfies a threshold difference value; means for selectively including, in response to determining that the pixels of the current block are homogeneous, block sizes of the plurality of block sizes that are greater than or equal to a threshold block size of the plurality of block sizes in a sub-set of block sizes to evaluate for use when intra encoding the pixels of the current block; and means for evaluating block sizes in the sub-set of block sizes for use when intra encoding the pixels of the current block.

In another example, a computer-readable storage medium stores instructions that, when executed by one or more processors of a video encoder, cause the one or more processors to: determine a respective variance value for pixels of each respective sub-block of at least four sub-blocks of a current block of video data of a particular block size of a plurality of block sizes; determine an average of the determined variance values for the at least four sub-blocks; determine a maximum difference value for the current block based on the determined average and the determined variance values for the at least four sub-blocks; determine whether pixels of the current block are homogeneous based on whether the maximum difference value for the current block satisfies a threshold difference value; selectively include, in response to determining that the pixels of the current block are homogeneous, block sizes of the plurality of block sizes that are greater than or equal to a threshold block size of the plurality of block sizes in a sub-set of block sizes to evaluate for use when intra encoding the pixels of the current block; and evaluate block sizes in the sub-set of block sizes for use when intra encoding the pixels of the current block.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
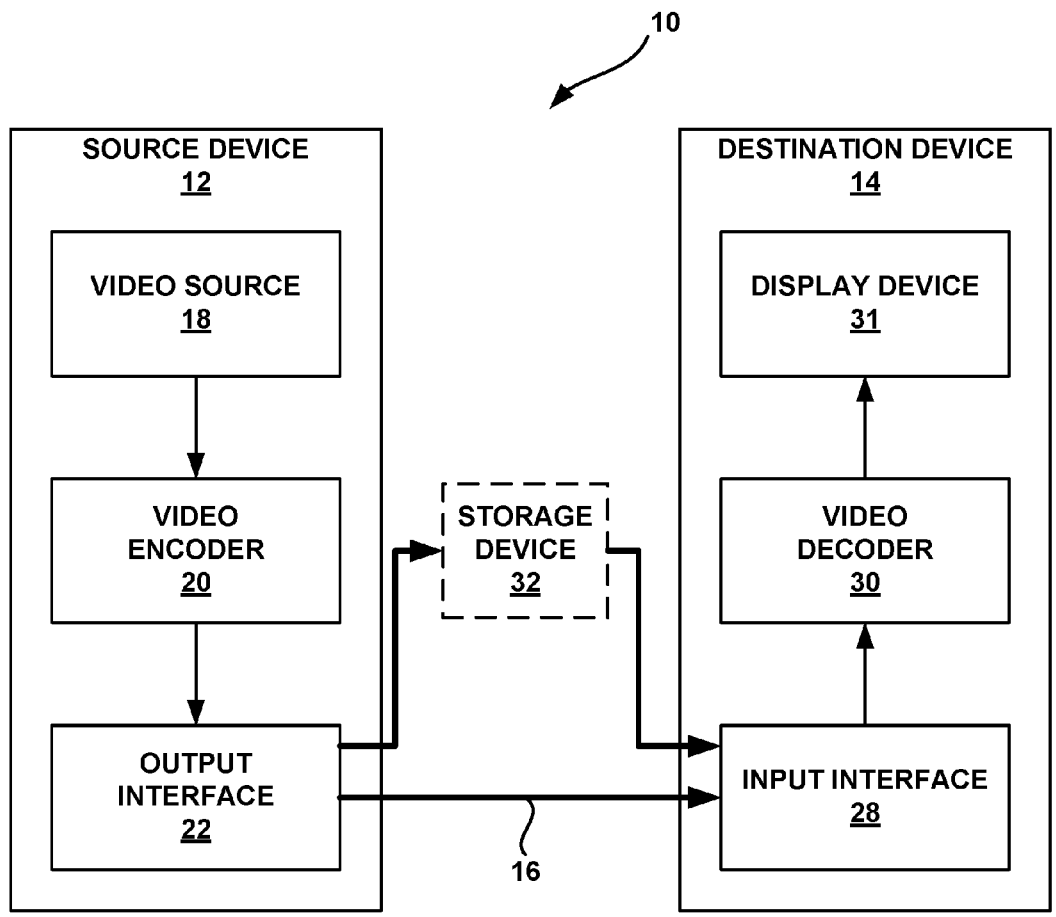
FIG. 1 is a block diagram illustrating an example video encoding and decoding system that may implement the techniques of this disclosure.

A video sequence is generally represented as a sequence of pictures. Typically, block-based coding techniques are used to code each of the individual pictures. That is, each picture is divided into blocks, and each of the blocks is individually coded. Coding a block of video data generally involves forming predicted values for pixels in the block and coding residual values. The prediction values are formed using pixel samples in one or more predictive blocks. The residual values represent the differences between the pixels of the original block and the predicted pixel values. Specifically, the original block of video data includes an array of pixel values, and the predicted block includes an array of predicted pixel values. The residual values represent to pixel-by-pixel differences between the pixel values of the original block and the predicted pixel values.

Prediction techniques for a block of video data are generally categorized as intra-prediction and inter-prediction. Intra-prediction, or spatial prediction, does not include prediction from any reference picture; instead the block is predicted from pixel values of neighboring, previously coded blocks. Inter-prediction, or temporal prediction, generally involves predicting the block from pixel values of one or more previously coded reference pictures (e.g., frames or slices) selected from one or more reference picture lists.

A video encoder may determine a block size and a mode when encoding video data using intra-prediction. In some examples, the determination of the block size and the mode may be referred to as an intra-mode decision. In some examples, the operations performed by a video encoder to make an intra-mode decision may be complex. For example, when encoding video data using intra-prediction under the High Efficiency Video Coding (HEVC) video coding standard (ITU-T H.265, Series H: Audiovisual and Multimedia Systems, Infrastructure of Audiovisual Services—Coding of Moving Video, April, 2015, available at http://www.itu.int/rec/T-REC-H.265-201504-I/en), a video encoder may be required to perform a large number of calculations because both coding unit (CU) size and intra-prediction mode for each CU may have to be determined. In particular, for HEVC, possible CU sizes include at least 64×64, 32×32, 16×16, and 8×8, and possible intra prediction modes include at least DC, Planar, and 33 different angular intra modes.

Currently, to find the optimal size of CU and prediction unit (PU), a video encoder may determine the rate-distortion (RD) cost for each combination of possible CU size and intra-prediction mode. This exhaustive search may contribute significant complexity to the overall complexity of the video encoder. As such, it may be desirable to reduce the complexity of the intra-mode decision.

In accordance with one or more techniques of this disclosure, as opposed to evaluating every possible combination of block size and intra-prediction mode, a video encoder may evaluate a subset of the possible combinations of block size and intra-prediction mode when encoding video data using intra-prediction. For instance, a video encoder may determine whether pixels of a current block of video data in a particular block size of a plurality of block sizes are substantially homogeneous. If pixels of the current block of video data in the particular block size are homogeneous, the video encoder may selectively include block sizes of the plurality of block sizes that are greater than or equal to the particular block size in a sub-set of block sizes to evaluate for use when intra-encoding the pixels of the current block. Similarly, if pixels of the current block of video data in the particular block size are not homogeneous, the video encoder may selectively include block sizes of the plurality of block sizes that are less than the particular block size in the sub-set of block sizes to evaluate for use when intra-encoding the pixels of the current block.

The video encoder may evaluate the sub-set of block sizes for use when intra-encoding the pixels of the current block. For instance, the video encoder may determine the rate-distortion (RD) cost for each block size included in the sub-set of block sizes, i.e., in terms of the coding bits required to code the block versus the image quality distortion introduced to the reconstructed block. As such, the video encoder may refrain from determining the RD cost for block sizes of the plurality of block sizes that are not included in the sub-set of block sizes. In this way, the video encoder may reduce the complexity of the intra-mode decision, thereby conserving encoder-side processing resources and/or reducing processing time required for intra mode decisions.

As discussed above, a video encoder may determine whether pixels of a current block of video data in a particular block size of a plurality of block sizes are homogeneous. In some examples, the video encoder may base the homogeneity determination on one or more metrics calculated based on the pixels of the current block. Some metrics which may be used by the video encoder include, but are not limited to, variance values of the values of the pixels of the current block (e.g., variance in luma and/or chroma values of the pixels in the block), and differential pulse-code modulation (DPCM) information of the pixels of the current block. Some examples of DPCM information of the pixels of the current block include, but are not necessarily limited to, sum of absolute difference (SAD) information of the pixels of the current block, and sum of squared differences (SSD) information of the pixels of the current block.

In some examples, to determine whether pixels of a current block of video data in a particular block size are homogeneous based on variance values of the pixels of the current block, a video coder may determine a maximum difference value for the pixels of the current block in the particular block size. To determine the maximum difference value, the video encoder may divide the current block of video data into at least four sub-blocks of video data. For instance, if the particular block size is 32×32, the video encoder may divide the current block of video data into four 16×16 sub-blocks of video data. The video encoder may determine a respective variance value for each respective sub-block of the at least four sub-blocks (e.g., $\sigma^2$ of each respective sub-block of the at least four sub-blocks), and determine an average of the variance values for the at least-four sub-blocks.

The video encoder may determine the maximum difference value as the absolute value of the largest difference between the variance values for the at least-four sub-blocks and the average of the variance values for the at least-four sub-blocks. For instance, the video encoder may determine the maximum difference value in accordance with Equation (1), below, where $MaxVarDiff_{2N \times 2N}$ is the maximum difference value, 2N×2N is the particular block size, N×N is the block size of each of the sub-blocks, x is the number of sub-blocks in the at least four sub-blocks, $Var_{N \times N, x}$ is the respective variance value for sub-block x, and $Var_{N \times N, Avg}$ is the average of the variance values for the at least-four sub-blocks.

$$MaxVarDiff_{2N \times 2N} = \max(|Var_{N \times N, x} - Var_{N \times N, Avg}|) \quad (1)$$

In some examples, the video encoder may use the original pixel values (i.e., unencoded the pixel values in the video data as received by the video encoder) to determine the variance values and thus the maximum difference value. In other examples, the video encoder may perform DPCM on the original pixel values and use the resulting DPCM-coded pixel values to determine the variance values and thus the maximum difference value.

The video encoder may base the determination of whether the pixels of the current block are homogeneous on whether the determined maximum difference value is greater than or equal to a threshold difference value. As one example, the video encoder may determine that the pixels of the current block are homogeneous where the determined maximum difference value is less than the threshold difference value. As another example, the video encoder may determine that the pixels of the current block are not homogeneous where the determined maximum difference value is greater than the threshold difference value.

In some examples, to determine whether pixels of a current block of video data in a particular block size are homogeneous based on DPCM information of the pixels of the current block, a video coder may determine a horizontal sum of absolute differences (SAD) value and a vertical SAD value for the pixels of the current block in the particular block size. In some examples, the video encoder may determine the horizontal SAD value and the vertical SAD value in accordance with Equations (2) and (3), below, where $SAD_{DPCMHor, 2N \times 2N}$ is the horizontal SAD value, $SAD_{DPCMVer, 2N \times 2N}$ is the vertical SAD value, 2N×2N is the particular block size, P(x,y) denotes a pixel value located at column x and row y within the current block.

$$SAD_{DPCMHor, 2N \times 2N} = \sum_{y=1}^{2N} \sum_{x=2}^{2N} |P(1, y) - P(x, y)| \quad (2)$$

$$SAD_{DPCMVer, 2N \times 2N} = \sum_{y=2}^{2N} \sum_{x=1}^{2N} |P(x, 1) - P(x, y)| \quad (3)$$

The video encoder may determine a minimum of the vertical and horizontal SAD values, i.e., which is lesser, the vertical SAD value or the horizontal SAD value. For instance, the video encoder may determine the lesser of the vertical and horizontal SAD values in accordance with Equation (4), below.

$$SAD_{DPCM, 2N \times 2N} = \min(SAD_{DPCMHor, 2N \times 2N}, SAD_{DPCMVer, 2N \times 2N}) \quad (4)$$

The video encoder may base the determination of whether the pixels of the current block are homogeneous on whether the lesser of the vertical and horizontal SAD values satisfies a threshold SAD value. As one example, the video encoder may determine that the pixels of the current block are homogeneous where the lesser of the vertical and horizontal SAD values is less than the threshold SAD value. As another example, the video encoder may determine that the pixels of the current block are not homogeneous where the lesser of the vertical and horizontal SAD values is greater than the threshold SAD value.

Such DPCM information, used together with variance values as discussed above, may be used by a video encoder to improve block size estimation accuracy. The improvement to block size estimation accuracy may be greater for certain types of content, such as screen content where a current block (e.g., an LCU) may contain multiple artificially flat regions in it (i.e., window boundaries and/or edges in presentation materials). For such content, variance values derived from sub-blocks of a block may be very different, yet it may still be preferred that prediction is done on the whole block without being partitioned into smaller blocks.

It should be noted that the DPCM information derived above is just an example. In practice, a video encoder may perform DPCM in many different ways and the results may still provide similar information in nature. For example, a video encoder may perform the DPCM operation in a recursive manner, with each pixel using its immediate top and/or left pixel as prediction. In another example, a video encoder may perform the DPCM operation in a two-dimensional manner, with each pixel using its top and left neighboring pixels to form a weighted prediction. All such different yet similar operations in performing DPCM are contemplated for use with the techniques of this disclosure.

In some examples, a video encoder may apply the above techniques in a cascaded manner to further narrow down the number of different block sizes selected for evaluation. The techniques may be cascaded in the sense that, as opposed to only checking a single block size for homogeneity, a video encoder may successively evaluate several block sizes for homogeneity until either only the smallest block size remains or pixel values within a particular block size are found to be homogeneous.

For instance, when selecting block sizes for a current 32×32 block of video data, a video encoder may first determine whether pixels in a 32×32 block size are homogeneous. If the pixels in the 32×32 block size are homogeneous, the video encoder may evaluate the 32×32 block size for use in intra-encoding the current block. If the pixels in the 32×32 block size are not homogeneous, the video encoder may determine whether pixels in a smaller block size, e.g., 16×16 block size, of the 32×32 block are homogeneous. If the pixels in the 16×16 block size are homogeneous, the video encoder may evaluate the 16×16 block size for use in intra-encoding the current block. If the pixels in the 16×16 block size are not homogeneous, the video encoder may determine whether pixels in an 8×8 block size or the 16×16 block are homogeneous. If the pixels in the 8×8 block size are homogeneous, the video encoder may evaluate the 8×8 block size for use in intra-encoding the current block. If the pixels in the 8×8 block size are not homogeneous, the video encoder may evaluate a 4×4 block size for use in intra-encoding the current block.

This disclosure describes example techniques related to selecting block sizes to evaluate for use when intra encoding pixels of video data. To assist with understanding, the example techniques are described with respect to the High Efficiency Video Coding (HEVC) video coding standard. It should be understood that the techniques are not limited to HEVC, and may be applicable generally to video coding techniques including standards-based or non-standards based video coding. Also, the techniques described in this disclosure may become part of standards-based or non-standards-based video coding techniques developed in the future. In other words, the techniques described in this disclosure may be applicable to previously developed video coding standards, video coding standards currently under development, and forthcoming video coding standards.

FIG. 1 is a block diagram illustrating an example video encoding and decoding system 10 that may implement the techniques of this disclosure. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, kiosks, home or industrial appliances, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 of source device 12 to a storage device 32. Similarly, encoded data may be accessed from the storage device 32 by input interface 28 of destination device 14. The storage device 32 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device 32 may correspond to a file server or another intermediate storage device that may store the encoded video generated by source device 12.

Destination device 14 may access stored video data from the storage device 32 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 31. In accordance with this disclosure, video encoder 20 of source device 12 may be configured to apply the techniques for performing transformation in video coding. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for improved intra block copy signaling in video coding may be performed by any digital video encoding and/or decoding device. Although generally the techniques of this disclosure are performed by a video encoding or decoding device, the techniques may also be performed by a video codec. Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc fabrication facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16 or storage device 32. The information of computer-readable medium 16 or storage device 32 may include syntax information defined by video encoder 20, which is also used by video decoder 30, that includes syntax elements that describe characteristics and/or processing of blocks and other coded units, e.g., Groups of Pictures (GOPs). Display device 31 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined video encoder/decoder (codec). A device including video encoder 20 and/or video decoder 30 may comprise an integrated circuit, a microprocessor, and/or a wireless communication device, such as a cellular telephone.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

This disclosure may generally refer to video encoder 20 "signaling" certain information to another device, such as video decoder 30. It should be understood, however, that video encoder 20 may signal information by associating certain syntax elements with various encoded portions of video data. That is, video encoder 20 may "signal" data by storing certain syntax elements to headers of various encoded portions of video data. In some cases, such syntax elements may be encoded and stored (e.g., stored to storage device 32) prior to being received and decoded by video decoder 30. Thus, the term "signaling" may generally refer to the communication of syntax or other data for decoding compressed video data, whether such communication occurs in real- or near-real-time or over a span of time, such as might occur when storing syntax elements to a medium at the time of encoding, which then may be retrieved by a decoding device at any time after being stored to this medium.

Video encoder 20 and video decoder 30 may operate according to a video compression standard, such as the HEVC standard. While the techniques of this disclosure are not limited to any particular coding standard, the techniques may be relevant to the HEVC standard. The HEVC standardization efforts are based on a model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-five intra-prediction encoding modes.

In general, the working model of the HM describes that a video picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive coding tree units (CTUs). Each of the CTUs may comprise a coding tree block of luma samples, two corresponding coding tree blocks of chroma samples, and syntax structures used to code the samples of the coding tree blocks. In a monochrome picture or a picture that have three separate color planes, a CTU may comprise a single coding tree block and syntax structures used to code the samples of the coding tree block.

A video picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs. A CU may comprise a coding block of luma samples and two corresponding coding blocks of chroma samples of a picture that has a luma sample array, a Cb sample array and a Cr sample array, and syntax structures used to code the samples of the coding blocks. In a monochrome picture or a picture that have three separate color planes, a CU may comprise a single coding block and syntax structures used to code the samples of the coding block. A coding block is an N×N block of samples.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU in HEVC has a purpose similar to the purpose of a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs.

In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. A prediction block may be a rectangular (i.e., square or non-square) block of samples on which the same prediction is applied. A PU of a CU may comprise a prediction block of luma samples, two corresponding prediction blocks of chroma samples of a picture, and syntax structures used to predict the prediction block samples. In a monochrome picture or a picture that have three separate color planes, a PU may comprise a single prediction block and syntax structures used to predict the prediction block samples.

TUs may include coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs, for example, differences between original and predicted values of the luma and chroma values of the original, unencoded pixels and the predicted pixels. Video encoder 20 may form the TUs including the residual data for the CU, and then transform the TUs to produce transform coefficients for the CU. A transform block may be a rectangular block of samples on which the same transform is applied. A transform unit (TU) of a CU may comprise a transform block of luma samples, two corresponding transform blocks of chroma samples, and syntax structures used to transform the transform block samples. In a monochrome picture or a picture that have three separate color planes, a TU may comprise a single transform block and syntax structures used to transform the transform block samples.

Following transformation, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Video encoder 20 may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

Video encoder 20 may further send syntax data, such as block-based syntax data, picture-based syntax data, and group of pictures (GOP)-based syntax data, to video decoder 30, e.g., in a picture header, a block header, a slice header, or a GOP header. The GOP syntax data may describe a number of pictures in the respective GOP, and the picture syntax data may indicate an encoding/prediction mode used to encode the corresponding picture.

Video decoder 30, upon obtaining the coded video data, may perform a decoding pass generally reciprocal to the encoding pass described with respect to video encoder 20. For example, video decoder 30 may obtain an encoded video bitstream that represents video blocks of an encoded video slice and associated syntax elements from video encoder 20.

Video decoder 30 may reconstruct the original, unencoded video sequence using the data contained in the bitstream.

Video encoder 20 and video decoder 30 may perform intra- and inter-coding of video blocks within video slices. Intra-coding relies on spatial prediction to reduce or remove spatial redundancy in video within a given video picture. Inter-coding relies on temporal prediction or inter-view prediction to reduce or remove temporal redundancy in video within adjacent pictures of a video sequence or reduce or remove redundancy with video in other views. Intra-mode (I mode) may refer to any of several spatial based compression modes (i.e., DC, Planar, and a plurality of angular modes). Inter-modes, such as uni-directional prediction (P mode) or bi-prediction (B mode), may refer to any of several temporal-based compression modes.

Video encoder 20 may perform an intra-mode decision when encoding video data using intra-prediction. For instance, video encoder 20 may determine which combination of block size and intra-prediction mode results in the best rate-distortion (RD) cost (i.e., the amount of coding distortion introduced relative to the bit-rate achieved). In some examples, to find the optimal block size and intra-prediction mode, video encoder 20 may determine the RD cost for each combination of possible CU size and intra-prediction mode. This exhaustive search may contribute significant complexity to the overall complexity of video encoder 20. As such, in order to reduce the overall complexity of video encoder 20, it may be desirable to reduce the complexity of the intra-mode decision.

In accordance with one or more techniques of this disclosure, instead of evaluating every possible combination of block size and intra-prediction mode in an exhaustive manner, video encoder 20 may evaluate a subset, i.e., less than all, of the possible combinations of block size and intra-prediction mode when encoding video data using intra-prediction. For instance, video encoder 20 may determine whether pixels of a current block of video data in a particular block size of a plurality of block sizes are homogeneous, e.g., using variance and/or DPCM-based techniques as described above. If pixels of the current block of video data in the particular block size are homogeneous, e.g., indicating relatively uniform texture, video encoder 20 may selectively include block sizes of the plurality of block sizes that are greater than or equal to the particular block size in a sub-set of block sizes to evaluate for use when intra-encoding the pixels of the current block. Similarly, if pixels of the current block of video data in the particular block size are not homogeneous, e.g., indicating relatively more texture complexity, video encoder 20 may selectively include block sizes of the plurality of block sizes that are less than the particular block size in the sub-set of block sizes to evaluate for use when intra-encoding the pixels of the current block.

Video encoder 20 may evaluate the sub-set, i.e., less than all, of a plurality of block sizes for use when intra-encoding the pixels of the current block, and not evaluate for intra mode prediction those block sizes that do not reside within the subset. For instance, video encoder 20 may determine the RD cost for each block size included in the sub-set of block sizes. As such, video encoder 20 may refrain from determining the RD cost for block sizes of the plurality of block sizes that are not included in the sub-set of block sizes. In this way, video encoder 20 may reduce the complexity of the intra-mode decision.

Figure 2:
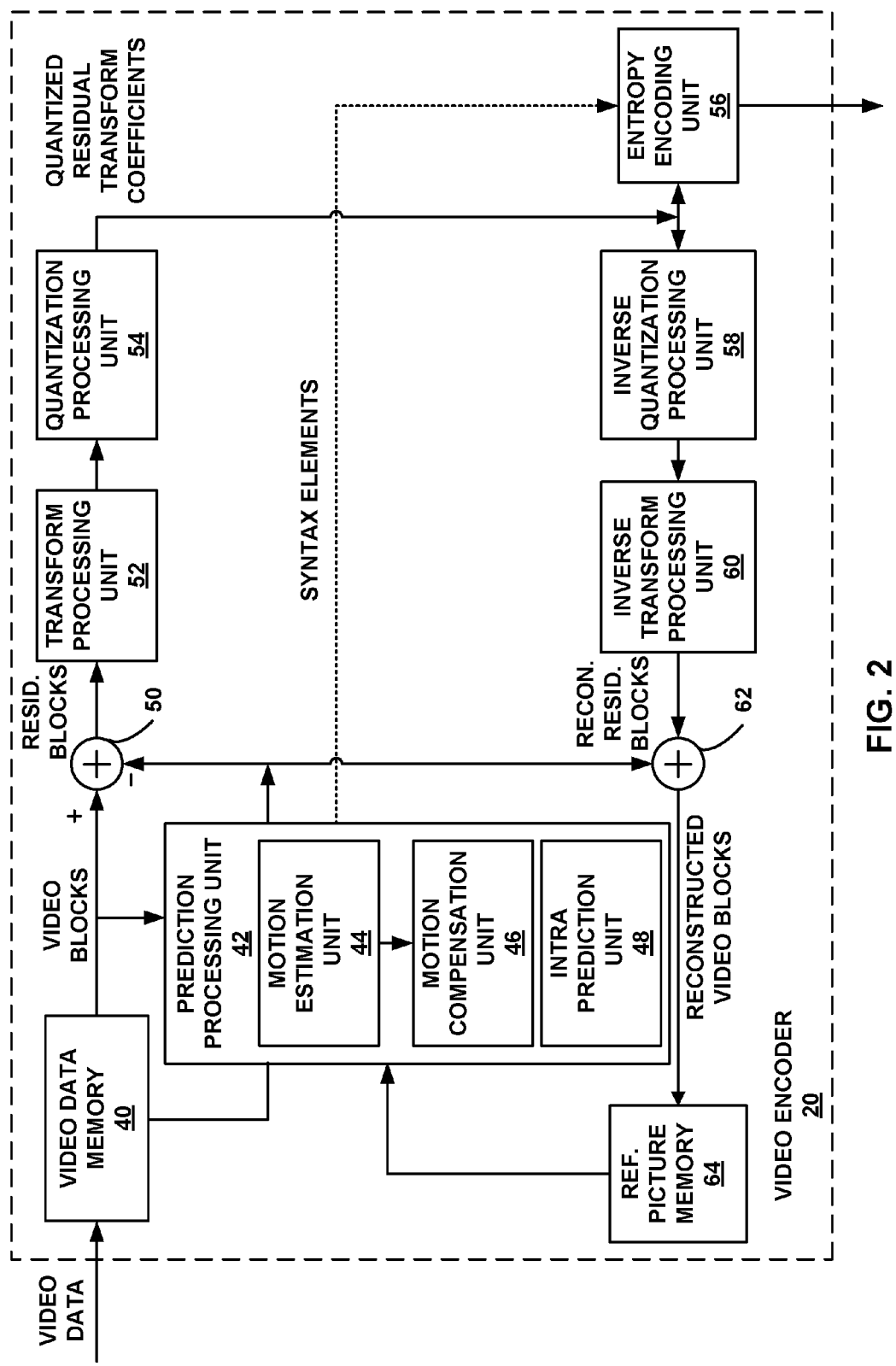
FIG. 2 is a block diagram illustrating an example of a video encoder 20 that may implement techniques described in this disclosure.

FIG. 2 is a block diagram illustrating an example of a video encoder 20 that may implement techniques described in this disclosure. The video encoder 20 will be described in the context of HEVC coding for purposes of illustration, but without limitation of this disclosure as to other coding standards.

Video encoder 20 may perform intra- and inter-coding of video blocks within video slices. Intra-coding relies on spatial prediction to reduce or remove spatial redundancy in video within a given video picture. Inter-coding relies on temporal prediction or inter-view prediction to reduce or remove temporal redundancy in video within adjacent pictures of a video sequence or reduce or remove redundancy with video in other views.

In the example of FIG. 2, video encoder 20 may include video data memory 40, prediction processing unit 42, reference picture memory 64, summer 50, transform processing unit 52, quantization processing unit 54, and entropy encoding unit 56. Prediction processing unit 42, in turn, includes motion estimation unit 44, motion compensation unit 46, and intra-prediction unit 48. For video block reconstruction, video encoder 20 also includes inverse quantization processing unit 58, inverse transform processing unit 60, and summer 62. A deblocking filter (not shown in FIG. 2) may also be included to filter block boundaries to remove blockiness artifacts from reconstructed video. If desired, the deblocking filter would typically filter the output of summer 62. Additional loop filters (in loop or post loop) may also be used in addition to the deblocking filter.

Video data memory 40 may store video data to be encoded by the components of video encoder 20. The video data stored in video data memory 40 may be obtained, for example, from video source 18 of FIG. 1. Reference picture memory 64 is one example of a decoding picture buffer (DPB) that stores reference video data for use in encoding video data by video encoder 20 (e.g., in intra- or inter-coding modes, also referred to as intra- or inter-prediction coding modes). Video data memory 40 and reference picture memory 64 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 40 and reference picture memory 64 may be provided by the same memory device or separate memory devices. In various examples, video data memory 40 may be on-chip with other components of video encoder 20, or off-chip relative to those components.

During the encoding process, video encoder 20 receives a video picture or slice to be coded. The picture or slice may be divided into multiple video blocks. Motion estimation unit 44 and motion compensation unit 46 perform inter-predictive coding of the received video block relative to one or more blocks in one or more reference pictures to provide temporal compression or provide inter-view compression. Intra-prediction unit 48 may alternatively perform intra-predictive coding of the received video block relative to one or more neighboring blocks in the same picture or slice as the block to be coded to provide spatial compression. Video encoder 20 may perform multiple coding passes (e.g., to select an appropriate coding mode for each block of video data).

Moreover, a partition unit (not shown) may partition blocks of video data into sub-blocks, based on evaluation of previous partitioning schemes in previous coding passes. For example, the partition unit may initially partition a picture or slice into LCUs, and partition each of the LCUs into sub-CUs based on rate-distortion analysis (e.g., rate-distortion optimization). Prediction processing unit 42 may further produce a quadtree data structure indicative of partitioning of an LCU into sub-CUs. Leaf-node CUs of the quadtree may include one or more PUs and one or more TUs.

Prediction processing unit 42 may select one of the coding modes, intra or inter, e.g., based on error results, and provides the resulting intra- or inter-coded block to summer 50 to generate residual block data and to summer 62 to reconstruct the encoded block for use as a reference picture. Prediction processing unit 42 also provides syntax elements, such as motion vectors, intra-mode indicators, partition information, and other such syntax information, to entropy encoding unit 56.

Motion estimation unit 44 and motion compensation unit 46 may be highly integrated, but are illustrated separately for conceptual purposes. Motion estimation, performed by motion estimation unit 44, is the process of generating motion vectors, which estimate motion for video blocks. A motion vector, for example, may indicate the displacement of a PU of a video block within a current video picture relative to a predictive block within a reference picture (or other coded unit) relative to the current block being coded within the current picture (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 44 may perform a motion search relative to the full pixel positions and fractional pixel positions and output a motion vector with fractional pixel precision.

Motion estimation unit 44 calculates a motion vector for a PU of a video block in an inter-coded slice by comparing the position of the PU to the position of a predictive block of a reference picture. The reference picture may be selected from one or more reference picture lists (RPLs) which identify one or more reference pictures stored in reference picture memory 64. Motion estimation unit 44 sends the calculated motion vector to entropy encoding unit 56 and motion compensation unit 46. In some examples, motion estimation unit 44 may send an indication of the selected reference picture to entropy encoding unit 56.

Motion compensation, performed by motion compensation unit 46, may involve fetching or generating the predictive block based on the motion vector determined by motion estimation unit 44. Again, motion estimation unit 44 and motion compensation unit 46 may be functionally integrated, in some examples. Upon receiving the motion vector for the PU of the current block, motion compensation unit 46 may locate the predictive block to which the motion vector points in one of the reference picture lists (RPLs). Summer 50 forms a residual video block by subtracting pixel values of the predictive block from the pixel values of the current block being coded, forming pixel difference values, as discussed below. In general, motion estimation unit 44 performs motion estimation relative to luma components, and motion compensation unit 46 uses motion vectors calculated based on the luma components for both chroma components and luma components. Prediction processing unit 42 may also generate syntax elements associated with the video blocks and the video slice for use by video decoder 30 in decoding the video blocks of the video slice.

Intra-prediction unit 48 may intra-predict a current block, as an alternative to the inter-prediction performed by motion estimation unit 44 and motion compensation unit 46, as described above. In particular, intra-prediction unit 48 may perform an intra-mode decision to determine an intra-prediction mode and a block size to use to encode a current block. In some examples, intra-prediction unit 48 may encode blocks using various intra-prediction modes, e.g., during separate encoding passes, and intra-prediction unit 48 may select an appropriate intra-prediction mode to use from a plurality of intra-prediction modes.

For example, intra-prediction unit 48 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 48 may calculate ratios from the distortions and rates for the various encoded blocks to determine which intra-prediction mode exhibits the best rate-distortion value for the block.

In some examples, the plurality of intra-prediction modes available for use by intra-prediction unit 48 may include a planar prediction mode, a DC prediction mode, and one or more angular prediction modes. Regardless of the selected mode, intra-prediction unit 48 may always predict a current block based reference samples of reconstructed blocks adjacent to the current block. In some examples, intra-prediction unit 48 may determine the horizontal predictions based on a left neighboring block and a top-right neighboring block (as samples of the right neighboring block may not be reconstructed when predicting the current block) and determine the vertical predictions based on a top neighboring block and a bottom-left neighboring block (as samples of the bottom neighboring block may not be reconstructed when predicting the current block).

As discussed above, intra-prediction unit 48 may perform an intra-mode decision to determine an intra-prediction mode and a block size to use to encode a current block. For instance, intra-prediction unit 48 may determine which combination of block size and intra-prediction mode results in the best rate-distortion (RD) cost (i.e., the amount of coding distortion introduced relative to the bit-rate achieved). In some examples, to find the optimal block size and intra-prediction mode, intra-prediction unit 48 may determine the RD cost for each combination of possible CU size and intra-prediction mode. The complexity of this exhaustive search performed by intra-prediction unit 48 may contribute significant complexity to the overall complexity of video encoder 20. As such, in order to reduce the overall complexity of video encoder 20, it may be desirable to reduce the complexity intra-prediction unit 48 by reducing the complexity of the intra-mode decision.

In accordance with one or more techniques of this disclosure, as opposed to evaluating every possible combination of block size and intra-prediction mode, to select one of a plurality of intra prediction modes, intra-prediction unit 48 may evaluate a subset, i.e., less than all, of the possible combinations of block size and intra-prediction mode when encoding video data using intra-prediction, and not evaluate combinations of block size and intra-prediction mode that are not in the subset. For instance, intra-prediction unit 48 may determine whether pixels of a current block of video data in a particular block size of a plurality of block sizes are homogeneous. If pixels of the current block of video data in the particular block size are homogeneous, intra-prediction unit 48 may include block sizes of the plurality of block sizes that are greater than or equal to the particular block size in a sub-set of block sizes to evaluate for use when intra-encoding the pixels of the current block. Similarly, if pixels of the current block of video data in the particular block size are not homogeneous, intra-prediction unit 48 may include block sizes of the plurality of block sizes that are less than the particular block size in the sub-set of block sizes to evaluate for use when intra-encoding the pixels of the current block.

Intra-prediction unit 48 may evaluate the sub-set of block sizes for use when intra-encoding the pixels of the current block. For instance, video encoder 20 may determine the RD cost for each block size included in the sub-set of block sizes. As such, intra-prediction unit 48 may refrain from determining the RD cost for block sizes of the plurality of block sizes that are not included in the sub-set of block sizes. In this way, video encoder 20 may reduce the complexity of the intra-mode decision.

As discussed above, intra-prediction unit 48 may determine whether pixels of a current block of video data in a particular block size of a plurality of block sizes are homogeneous. In some examples, intra-prediction unit 48 may base the homogeneity determination on one or more metrics calculated based on the pixels of the current block. Some metrics which may be used by intra-prediction unit 48 include, but are not limited to, variance values of the pixels of the current block, and differential pulse-code modulation (DPCM) information of the pixels of the current block.

In some examples, intra-prediction unit 48 may base the determination of whether pixels of a current block of video data in a particular block size are homogeneous on a maximum difference value for the pixels of the current block in the particular block size. To determine the maximum difference value, intra-prediction unit 48 may divide the current block of video data into at least four sub-blocks of video data. For instance, if the particular block size is 32×32, intra-prediction unit 48 may divide the current block of video data into four 16×16 sub-blocks of video data. Intra-prediction unit 48 may determine a respective variance value for each respective sub-block of the at least four sub-blocks, and determine an average of the variance values for the at least-four sub-blocks. Intra-prediction unit 48 may determine the maximum difference value as the absolute value of the largest difference between the variance values for the at least-four sub-blocks and the average of the variance values for the at least-four sub-blocks. For instance, intra-prediction unit 48 may determine the maximum difference value in accordance with Equation (1), above.

In some examples, intra-prediction unit 48 may use the original pixel values to determine the variance values the sub-blocks and thus the maximum difference value. In other examples, the video encoder may perform DPCM on the original pixel value and use the resulting pixel value to determine the variance values of the sub-blocks and thus the maximum difference value.

Intra-prediction unit 48 may base the determination of whether the pixels of the current block are homogeneous on whether the determined maximum difference value satisfies a threshold difference value. As one example, intra-prediction unit 48 may determine that the pixels of the current block are homogeneous when the determined maximum difference value is less than the threshold difference value. As another example, intra-prediction unit 48 may determine that the pixels of the current block are not homogeneous when the determined maximum difference value is greater than the threshold difference value.

In some examples, intra-prediction unit 48 may base the determination of whether the pixels of the current block are homogeneous on DPCM information of the pixels of the current block, i.e., DPCM-coded pixel values, rather than unencoded pixel values of the current block. For instance, intra-prediction unit 48 may determine a horizontal sum of absolute differences (SAD) value and a vertical SAD value for the pixels of the current block in the particular block size. In some examples, intra-prediction unit 48 may determine the horizontal SAD value and the vertical SAD value in accordance with Equations (2) and (3), above.

Intra-prediction unit 48 may base the determination of whether the pixels of the current block are homogeneous on whether the lesser of the vertical and horizontal SAD values satisfies a threshold SAD value. As one example, intra-prediction unit 48 may determine that the pixels of the current block are homogeneous when the lesser of the vertical and horizontal SAD values is less than the threshold SAD value. As another example, intra-prediction unit 48 may determine that the pixels of the current block are not homogeneous when the lesser of the vertical and horizontal SAD values is greater than the threshold SAD value.

In some examples, intra-prediction unit 48 may base the determination of whether the pixels of the current block are homogeneous on whether a variance of the pixels of the current block satisfies a threshold variance value. As one example, intra-prediction unit 48 may determine that the pixels of the current block are homogeneous where the variance of the pixels of the current block is less than the threshold variance value. As another example, intra-prediction unit 48 may determine that the pixels of the current block are not homogeneous where the variance of the pixels of the current block is greater than the threshold variance value.

In some examples, intra-prediction unit 48 may base the determination of whether the pixels of the current block are homogeneous on a combination of the above factors. As one example, intra-prediction unit 48 may determine that the pixels of the current block are homogeneous when either the determined maximum difference value is less than the threshold difference value, or the lesser of the vertical and horizontal SAD values is less than the threshold SAD value. As another example, intra-prediction unit 48 may determine that whether the pixels of the current block are homogeneous when one or more of the determined maximum difference value is less than the threshold difference value, the lesser of the vertical and horizontal SAD values is less than the threshold SAD value, and the variance of the pixels of the current block is less than the threshold variance value.

In some examples, intra-prediction unit 48 may apply the above techniques in a cascaded manner to further narrow down the number of different block sizes selected for evaluation. For instance, intra-prediction unit 48 may first determine whether the pixels of a current block in a first block size are homogeneous. If the pixels of the current block in the first block size are homogeneous, intra-prediction unit 48 may evaluate block sizes greater than or equal to the first block size for intra encoding the pixels of the current block. If the pixels of the current block in the first block size are not homogeneous, intra-prediction unit 48 may determine whether the pixels of the current block in a second block size that is smaller than the first block size are substantially homogeneous. If the pixels of the current block in the second block size are homogeneous, intra-prediction unit 48 may evaluate block sizes greater than or equal to the second block size but less than the first block size for intra encoding the pixels of the current block. If the pixels of the current block in the second block size are not homogeneous, intra-prediction unit 48 may determine whether the pixels of the current block in a third block size that is smaller than the second block size are homogeneous. In some examples, intra-prediction unit 48 may repeat the above process until pixels in a block size are found to be homogeneous, or until there is only one block size (e.g., the smallest block size) remaining.

As discussed above, intra-prediction unit 48 may use one or more thresholds (e.g., the threshold difference value, the threshold SAD value, and the threshold variance value) when determining whether pixels are homogeneous. In some examples, one or more of the threshold values may be fixed. In some examples, one or more of the threshold values may be adaptive. Where one or more of the threshold values are adaptive, intra-prediction unit 48 may adaptively determine the one or more adaptive threshold values based on one or more parameters, such as quantization parameter (QP), and/or block sizes currently under consideration. For example, when the decision is made in a cascaded manner, the threshold used by intra-prediction unit 48 at a current level (e.g., when determining whether pixels in a 16×16 block size are homogeneous) can be dependent on the threshold used by intra-prediction unit 48 at a higher level (e.g., when determining whether pixels in a 32×32 block size are homogeneous).

Video encoder 20 forms a residual video block by subtracting the prediction data from prediction processing unit 42 from the original video block being coded. Summer 50 represents the component or components that perform this subtraction operation.

Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain.

Transform processing unit 52 may send the resulting transform coefficients to quantization processing unit 54. Quantization processing unit 54 quantizes the transform coefficients to further reduce bit rate. The quantization process may reduce the bit depth associated with some or all of the coefficients. The degree of quantization may be modified by adjusting a quantization parameter. In some examples, quantization processing unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization processing unit 58 and inverse transform processing unit 60 apply inverse quantization and inverse transformation, respectively, to reconstruct the residual block in the pixel domain, e.g., for later use as a reference block.

Motion compensation unit 46 may also apply one or more interpolation filters to the reference block to calculate subinteger pixel values for use in motion estimation. Summer 62 adds the reconstructed residual block to the motion compensated prediction block produced by motion compensation unit 46 to produce a reconstructed video block for storage in reference picture memory 64. The reconstructed video block may be used by motion estimation unit 44 and motion compensation unit 46 as a reference block to inter-code a block in a subsequent video picture.

A filtering unit (not shown) may perform a variety of filtering processes. For example, the filtering unit may perform deblocking. That is, the filtering unit may receive a plurality of reconstructed video blocks forming a slice or a frame of reconstructed video and filter block boundaries to remove blockiness artifacts from a slice or frame. In one example, the filtering unit evaluates the so-called "boundary strength" of a video block. Based on the boundary strength of a video block, edge pixels of a video block may be filtered with respect to edge pixels of an adjacent video block such that the transitions from one video block to another video block are more difficult for a viewer to perceive. In some examples, the filtering unit may also perform adaptive loop filtering (ALF) and/or sample-adaptive offset (SAO) filtering.

While a number of different aspects and examples of the techniques are described in this disclosure, the various aspects and examples of the techniques may be performed together or separately from one another. In other words, the techniques should not be limited strictly to the various aspects and examples described above, but may be used in combination or performed together and/or separately. In addition, while certain techniques may be ascribed to certain units of video encoder 20 (such as intra-prediction unit 48, motion compensation unit 46, or entropy encoding unit 56) it should be understood that one or more other units of video encoder 20 may also be responsible for carrying out such techniques.

In this way, video encoder 20 may be configured to implement one or more example techniques described in this disclosure. For example, video encoder 20 may be configured to determine a respective variance value for pixels of each respective sub-block of at least four sub-blocks of a current block of video data of a particular block size of a plurality of block sizes; determine an average of the determined variance values for the at least four sub-blocks; determine a maximum difference value for the current block based on the determined average and the determined variance values for the at least four sub-blocks; determine whether pixels of the current block are homogeneous based on whether the maximum difference value for the current block satisfies a threshold difference value; and include, in response to determining that the pixels of the current block are homogeneous, block sizes of the plurality of block sizes that are greater than or equal to a threshold block size of the plurality of block sizes in a sub-set of block sizes to evaluate for use when intra encoding the pixels of the current block.

Figure 3:
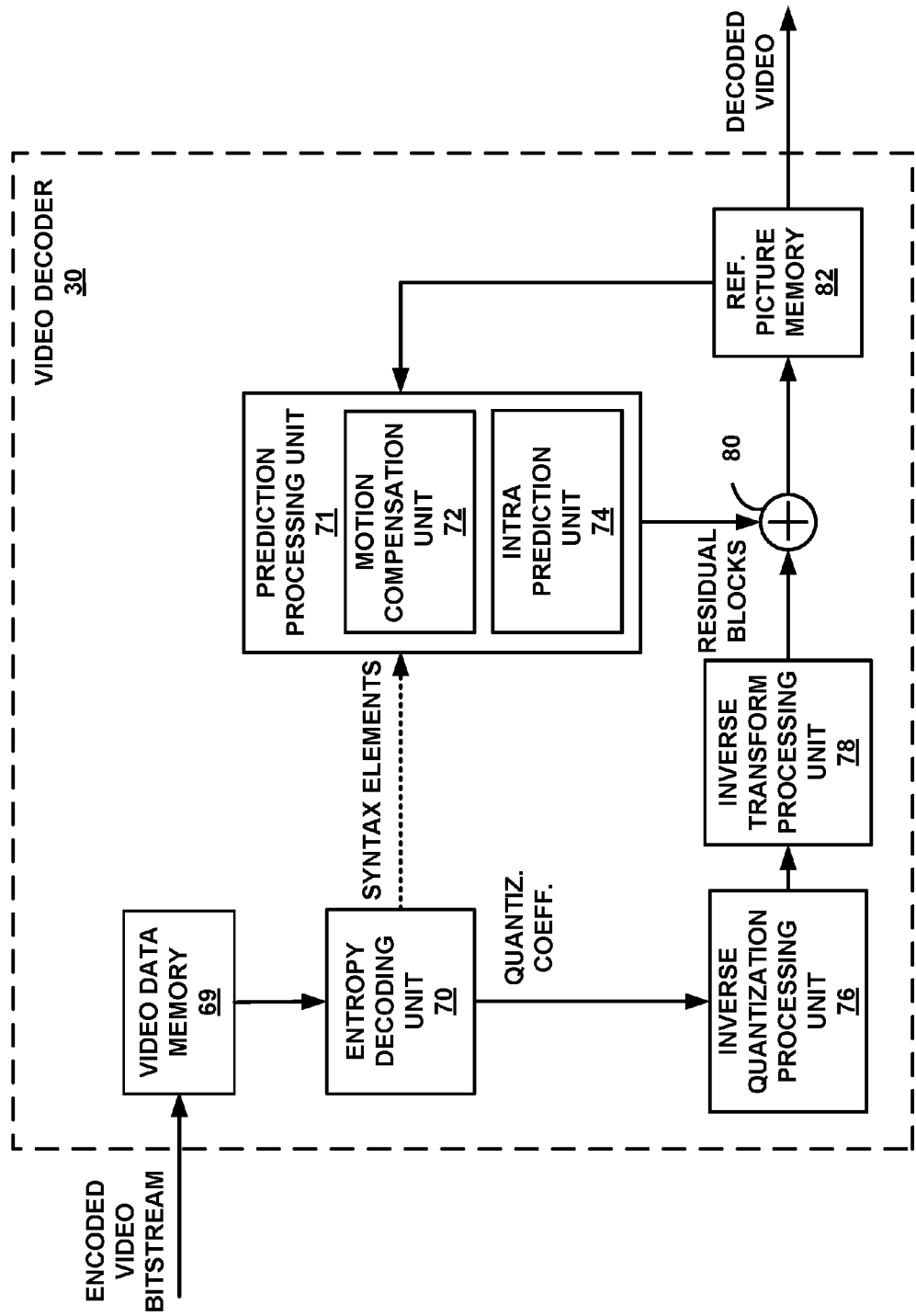
FIG. 3 is a block diagram illustrating an example of video decoder 30 that may implement techniques described in this disclosure.

FIG. 3 is a block diagram illustrating an example of video decoder 30 that may implement techniques described in this disclosure. Again, the video decoder 30 will be described in the context of HEVC coding for purposes of illustration, but without limitation of this disclosure as to other coding standards.

In the example of FIG. 3, video decoder 30 may include video data memory 69, entropy decoding unit 70, prediction processing unit 71, inverse quantization processing unit 76, inverse transform processing unit 78, summer 80, and reference picture memory 82. Prediction processing unit 71 includes motion compensation unit 72 and intra prediction unit 74. Video decoder 30 may, in some examples, perform a decoding pass generally reciprocal to the encoding pass described with respect to video encoder 20 from FIG. 2.

Video data memory 69 may store video data, such as an encoded video bitstream, to be decoded by the components of video decoder 30. The video data stored in video data memory 69 may be obtained, for example, from storage device 34 of FIG. 1, from a local video source, such as a camera, via wired or wireless network communication of video data, or by accessing physical data storage media. Video data memory 69 may form a coded picture buffer (CPB) that stores encoded video data from an encoded video bitstream.

Reference picture memory 82 is one example of a decoded picture buffer (DPB) that stores reference video data for use in decoding video data by video decoder 30 (e.g., in intra- or inter-coding modes). Video data memory 69 and reference picture memory 82 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 69 and reference picture memory 82 may be provided by the same memory device or separate memory devices. In various examples, video data memory 69 may be on-chip with other components of video decoder 30, or off-chip relative to those components.

During the decoding process, video decoder 30 receives an encoded video bitstream that represents video blocks of an encoded video slice and associated syntax elements from video encoder 20 of FIGS. 1 and 2. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

In some examples, when the video slice is coded as an intra-coded (I) slice, intra prediction unit 74 may generate prediction data for a video block of the current video slice based on a signaled intra prediction mode and data from previously decoded blocks of the current picture. In some examples, when the video picture is coded as an inter-coded (i.e., B or P) slice, motion compensation unit 72 produces predictive blocks for a video block of the current video slice based on the motion vectors and other syntax elements received from entropy decoding unit 70.

Motion compensation unit 72 determines prediction information for a video block of the current video slice by parsing the motion vectors and other syntax elements, and uses the prediction information to produce the predictive blocks for the current block being decoded. For example, motion compensation unit 72 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 of FIGS. 1 and 2 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization processing unit 76 inverse quantizes, i.e., de-quantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied.

Inverse transform processing unit 78 applies an inverse transform, e.g., an inverse DCT, an inverse integer transform, or a conceptually similar inverse transform process, to the transform coefficients in order to produce residual blocks in the pixel domain. Video decoder 30 forms a decoded video block by summing the residual blocks from inverse transform processing unit 78 with the corresponding predictive blocks generated by motion compensation unit 72. Summer 80 represents the component or components that perform this summation operation.

Video decoder 30 may include a filtering unit, which may, in some examples, be configured similarly to the filtering unit of video encoder 20 described above. For example, the filtering unit may be configured to perform deblocking, SAO, or other filtering operations when decoding and reconstructing video data from an encoded bitstream.

While a number of different aspects and examples of the techniques are described in this disclosure, the various aspects and examples of the techniques may be performed together or separately from one another. In other words, the techniques should not be limited strictly to the various aspects and examples described above, but may be used in combination or performed together and/or separately. In addition, while certain techniques may be ascribed to certain units of video decoder 30 it should be understood that one or more other units of video decoder 30 may also be responsible for carrying out such techniques.

Figure 4:
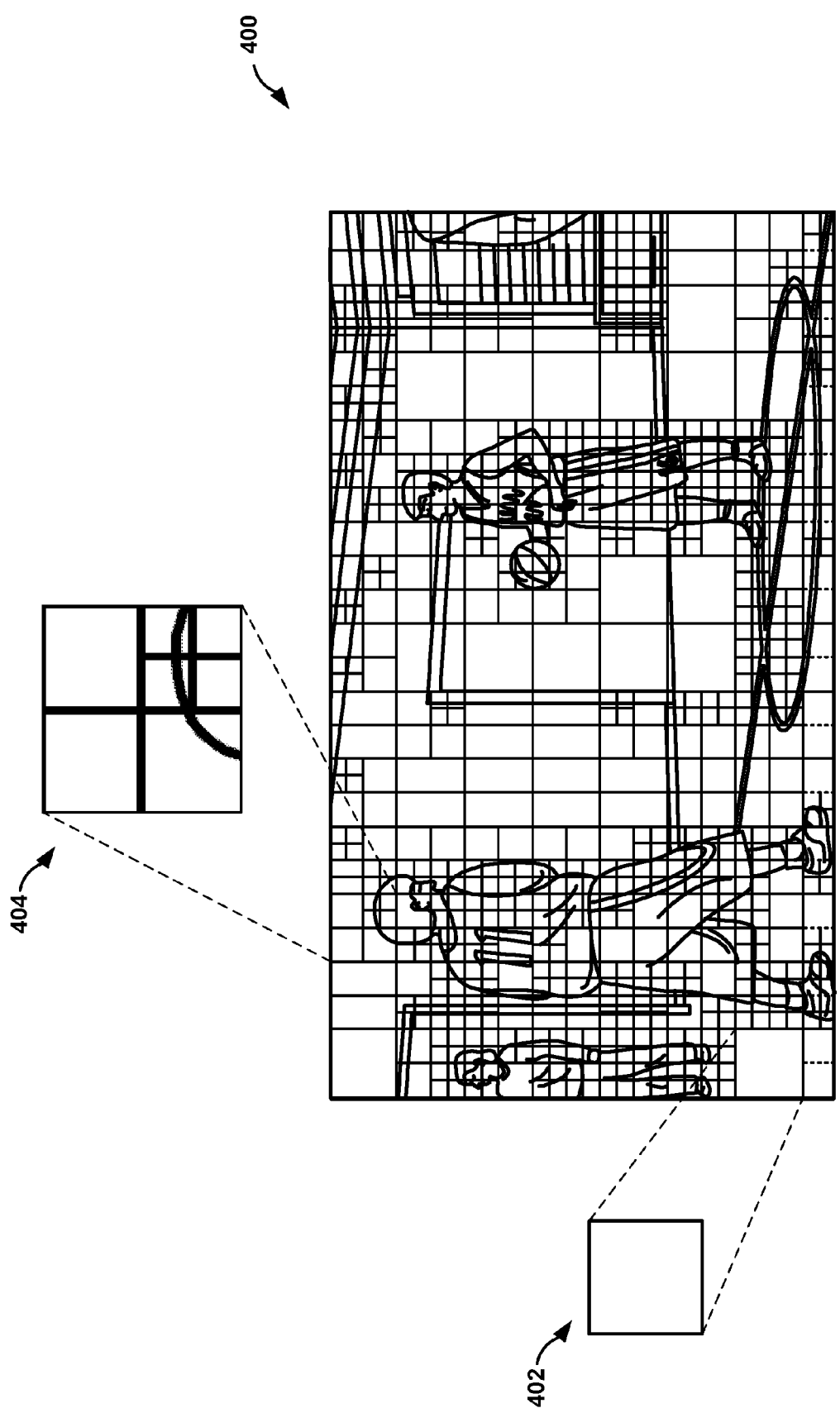
FIG. 4 is a conceptual diagram illustrating a picture of video data partitioned into various block sizes, in accordance with one or more techniques of this disclosure.

FIG. 4 is a conceptual diagram illustrating a picture of video data partitioned into various block sizes, in accordance with one or more techniques of this disclosure. As illustrated in FIG. 4, picture 400 represents two people on a basketball court with a third person in the background. Within picture 400, there are some "flat" or "homogeneous" regions (e.g., the wall and floor), and regions with moving objects or object boundaries (e.g., the boundary of human bodies and the ball).

As discussed above, a video encoder, such as video encoder 20 of FIGS. 1 and 2 may perform an intra-mode decision to determine an intra-prediction mode and a block size to use to encode a current block. For instance, intra-prediction unit 48 of video encoder 20 may perform an intra-mode decision to determine an intra-prediction mode and a block size to use to encode block 402.

In accordance with one or more techniques of this disclosure, as opposed to evaluating every possible combination of block size and intra-prediction mode, intra-prediction unit 48 may evaluate a subset of the possible combinations of block size and intra-prediction mode when encoding block 402 using intra-prediction. As one example, intra-prediction unit 48 may determine whether pixels of block 402 in a 32×32 block size are homogeneous. In the example of FIG. 4, intra-prediction unit 48 of FIG. 2 may determine that pixels of block 402 in the 32×32 block size are homogeneous. For instance, intra-prediction unit 48 may determine that a maximum difference value for block 402 satisfies a threshold difference value. In response to determining that the pixels of block 402 in the 32×32 block size are homogeneous, intra-prediction unit 48 may evaluate the 32×32 block size for use when intra encoding the pixels of block 402.

As another example, intra-prediction unit 48 may determine whether pixels of block 404 in a 32×32 block size are homogeneous. In the example of FIG. 4, intra-prediction unit 48 may determine that pixels of block 404 in the 32×32 block size are not homogeneous. For instance, intra-prediction unit 48 may determine that a maximum difference value for block 404 does not satisfy a threshold difference value. In response to determining that the pixels of block 404 in the 32×32 block size are not homogeneous, intra-prediction unit 48 may evaluate block sizes smaller than the 32×32 block size for use when intra encoding the pixels of block 404.

Figure 5:
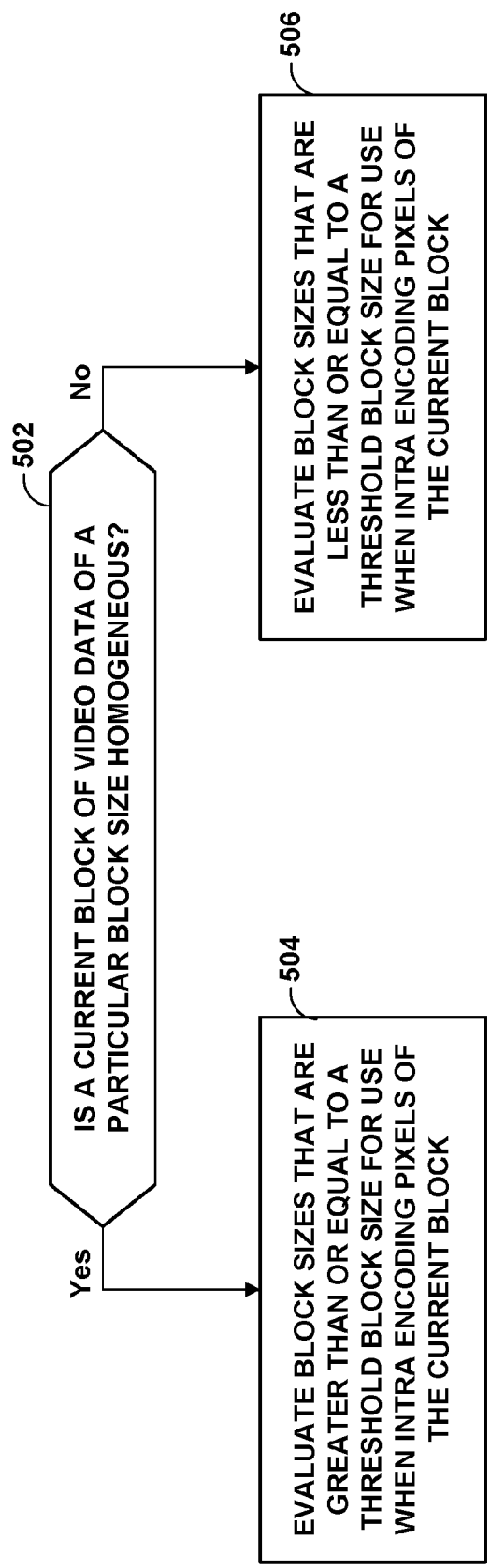
FIG. 5 is a flow diagram illustrating example operations of a video encoder to select a sub-set of a plurality of block sizes to evaluate for use when intra encoding pixels of a block of video data, in accordance with one or more techniques of the disclosure.

FIG. 5 is a flow diagram illustrating example operations of a video encoder to select a sub-set of a plurality of block sizes to evaluate for use when intra encoding pixels of a block of video data, in accordance with one or more techniques of the disclosure. The techniques of FIG. 5 may be performed by one or more video encoders, such as video encoder 20 illustrated in FIGS. 1 and 2. For purposes of illustration, the techniques of FIG. 5 are described within the context of video encoder 20, although video encoders having configurations different than that of video encoder 20 may perform the techniques of FIG. 5.

In accordance with one or more techniques of this disclosure, video encoder 20 may determine whether pixels of a current block of video data of a particular block size of a plurality of block sizes are homogeneous (502). In some examples, video encoder 20 may determine whether the pixels of the current block of video data of the particular block size are homogeneous in accordance with the techniques of FIG. 6.

In response to determining that the pixels of the current block are homogeneous ("Yes" branch of 502), video encoder 20 may evaluate block sizes of the plurality of block sizes that are greater than or equal to a threshold block size for use when intra encoding pixels of the current block (504). In response to determining that the pixels of the current block are not homogeneous ("No" branch of 502), video encoder 20 may evaluate block sizes of the plurality of block sizes that are less than or equal to the threshold block size for use when intra encoding pixels of the current block (506). As such, video encoder 20 may evaluate less than all of the plurality of block sizes. For instance, as opposed to determining a respective RD cost for each block size of the plurality of block sizes, video encoder 20 may determine a respective RD cost for a sub-set of block sizes of the plurality of block sizes. In this way, the techniques of this disclosure may reduce the complexity of the intra mode decision.

As one illustrative example, where the current block is a 32×32 LCU, the threshold block size is 16×16, and a 4×4 block size is disabled (i.e., INTRA N×N mode is disabled), video encoder 20 may determine whether pixels of the 32×32 LCU in a 16×16 block size are homogeneous. If the pixels of the 32×32 LCU in a 16×16 block size are homogeneous, video encoder 20 may evaluate the 32×32 and 16×16 block sizes for intra-encoding the pixels of the current block. Otherwise, if the pixels of the 32×32 LCU in a 16×16 block size are not homogeneous, video encoder 20 may evaluate the 8×8 and 16×16 block sizes for intra-encoding the pixels of the current block.

In this example, based on its homogeneity, video encoder 20 may classify the current block into one of two cases. If the current block is classified as a homogenous block, video encoder 20 may only check 32×32 and 16×16 CU partition sizes during RD optimization. Otherwise, video encoder 20 may only check 16×16 and 8×8 CU partition sizes during RD optimization. In either case, the maximum number of different CU partition sizes checked by video encoder 20 is reduced to two from the original three. For certain practical implementations, this may result in a complexity reduction of ⅓ for the RD optimization module of video encoder 20.

In some examples, as opposed to using a single threshold value, video encoder 20 may use different threshold values. For instance, where the pixels of the current block are homogeneous, video encoder 20 may evaluate block sizes of the plurality of block sizes that are greater than or equal to a first threshold block size for use when intra encoding pixels of the current block (i.e., where the first threshold block size is 16×16, the 32×32 and 16×16 block sizes may be evaluated). Otherwise, where the pixels of the current block are not homogeneous, video encoder 20 may evaluate block sizes of the plurality of block sizes that are less than or equal to a second threshold block size for use when intra encoding pixels of the current block (i.e., where the second threshold block size is 8×8, the 8×8 and 4×4 block sizes may be evaluated).

The threshold may be variable (i.e., selected based on system complexity constraints and desired distribution). For example, if an 8×8 CU also includes a 4×4 block partition, e.g., the INTRA N×N mode as defined in HEVC, video encoder 20 may reduce the first threshold block size to 8×8 to better balance the complexity.

Figure 6:
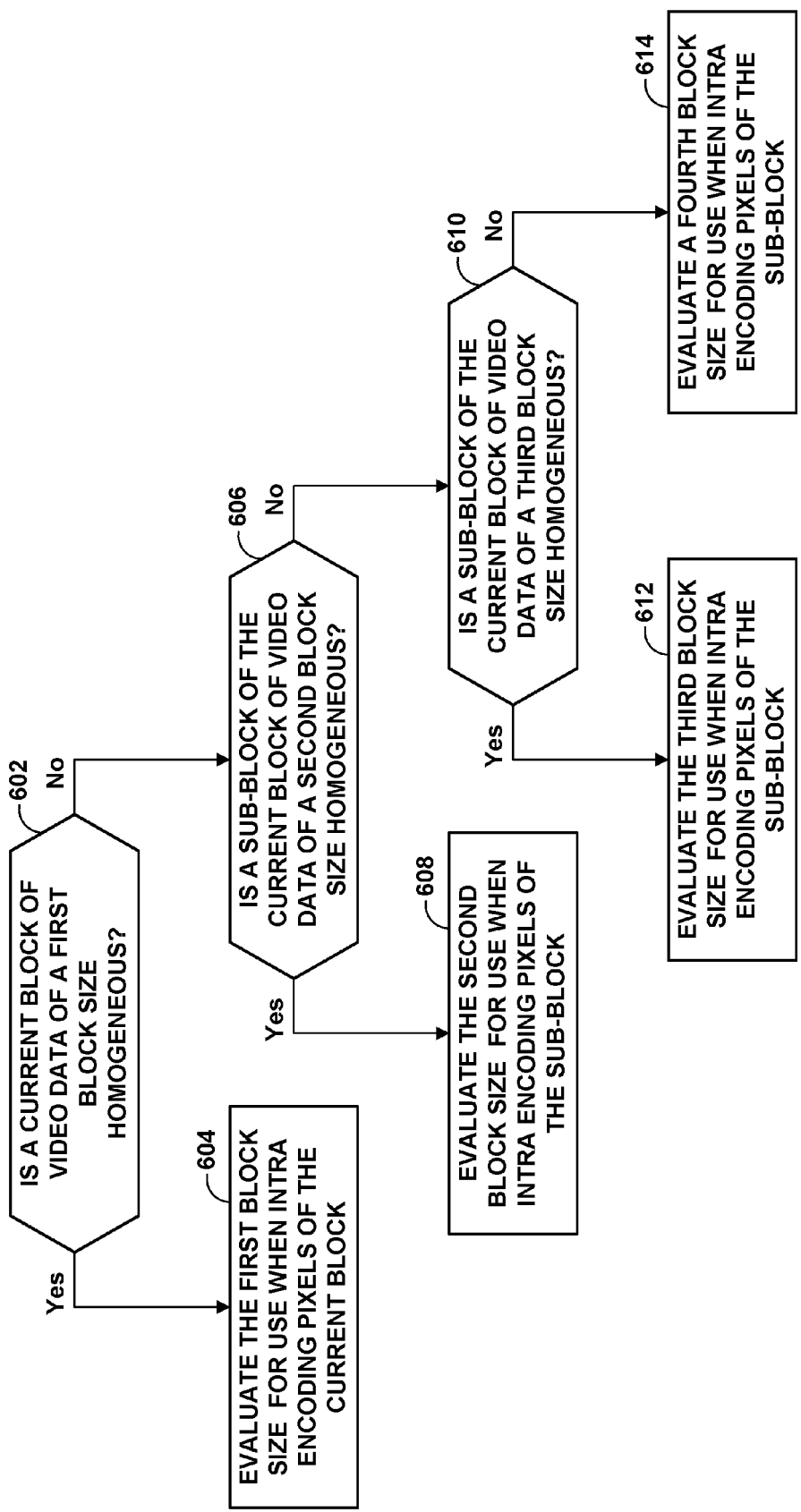
FIG. 6 is a flow diagram illustrating example operations of a video encoder to select a sub-set of a plurality of block sizes to evaluate for use when intra encoding pixels of a block of video data, in accordance with one or more techniques of the disclosure.

FIG. 6 is a flow diagram illustrating example operations of a video encoder to select a sub-set of a plurality of block sizes to evaluate for use when intra encoding pixels of a block of video data, in accordance with one or more techniques of the disclosure. The techniques of FIG. 6 may be performed by one or more video encoders, such as video encoder 20 illustrated in FIGS. 1 and 2. For purposes of illustration, the techniques of FIG. 6 are described within the context of video encoder 20, although video encoders having configurations different than that of video encoder 20 may perform the techniques of FIG. 6.

As discussed above and in accordance with one or more techniques of this disclosure, video encoder 20 may successively evaluate several block sizes for homogeneity. In some examples, video encoder 20 may successively evaluate several block sizes for homogeneity until either only the smallest block size remains or pixel values within a particular block size are found to be homogeneous.

As illustrated in FIG. 6, video encoder 20 may determine whether pixels in a current block of video data of a first block size are homogeneous (602). For instance, if the current block is a 32×32 LCU, video encoder 20 may determine whether pixels in a 32×32 block size are homogeneous. If the pixels in the current block of video data of the first block size are homogeneous ("Yes" branch of 602), video encoder 20 may evaluate the first block size for use when intra encoding the pixels of the current block (604). For instance, if the pixels of the LCU in the 32×32 block size are homogeneous, video encoder 20 may evaluate the 32×32 block size for use when intra encoding the pixels of the LCU.

If the pixels in the current block of video data of the first block size are not homogeneous ("No" branch of 602), video encoder 20 may determine whether pixels in a sub-block of the current block of video data of a second block size are homogeneous (606). For instance, if the pixels of the LCU in the 32×32 block size are not homogeneous, video encoder 20 may determine whether pixels of the LCU in a 16×16 block size are homogeneous. If the pixels in the sub-block of the current block of video data of the second block size are homogeneous ("Yes" branch of 606), video encoder 20 may evaluate the second block size for use when intra encoding the pixels of the sub-block (608). For instance, if the pixels of the LCU in the 16×16 block size are homogeneous, video encoder 20 may evaluate the 16×16 block size for use when intra encoding the pixels of the LCU.

If the pixels in the sub-block of the current block of video data of the second block size are not homogeneous ("No" branch of 606), video encoder 20 may determine whether pixels in a sub-block of the current block of video data of a third block size are homogeneous (610). For instance, if the pixels of the LCU in the 16×16 block size are not homogeneous, video encoder 20 may determine whether pixels of the LCU in an 8×8 block size are homogeneous. If the pixels in the sub-block of the current block of video data of the third block size are homogeneous ("Yes" branch of 610), video encoder 20 may evaluate the third block size for use when intra encoding the pixels of the sub-block (612). For instance, if the pixels of the LCU in the 8×8 block size are homogeneous, video encoder 20 may evaluate the 8×8 block size for use when intra encoding the pixels of the LCU. If the pixels in the sub-block of the current block of video data of the third block size are not homogeneous ("No" branch of 610), video encoder 20 may evaluate a fourth block size for use when intra encoding the pixels of the sub-block (614). For instance, if the pixels of the LCU in the 8×8 block size are not homogeneous, video encoder 20 may evaluate a 4×4 block size for use when intra encoding the pixels of the LCU.

In some examples, through such a cascaded homogeneity checking process, the number of different partition sizes may be narrowed down to one for each branch. In this case, the complexity of the intra-mode decision may be reduced by ⅔.

Figure 7:
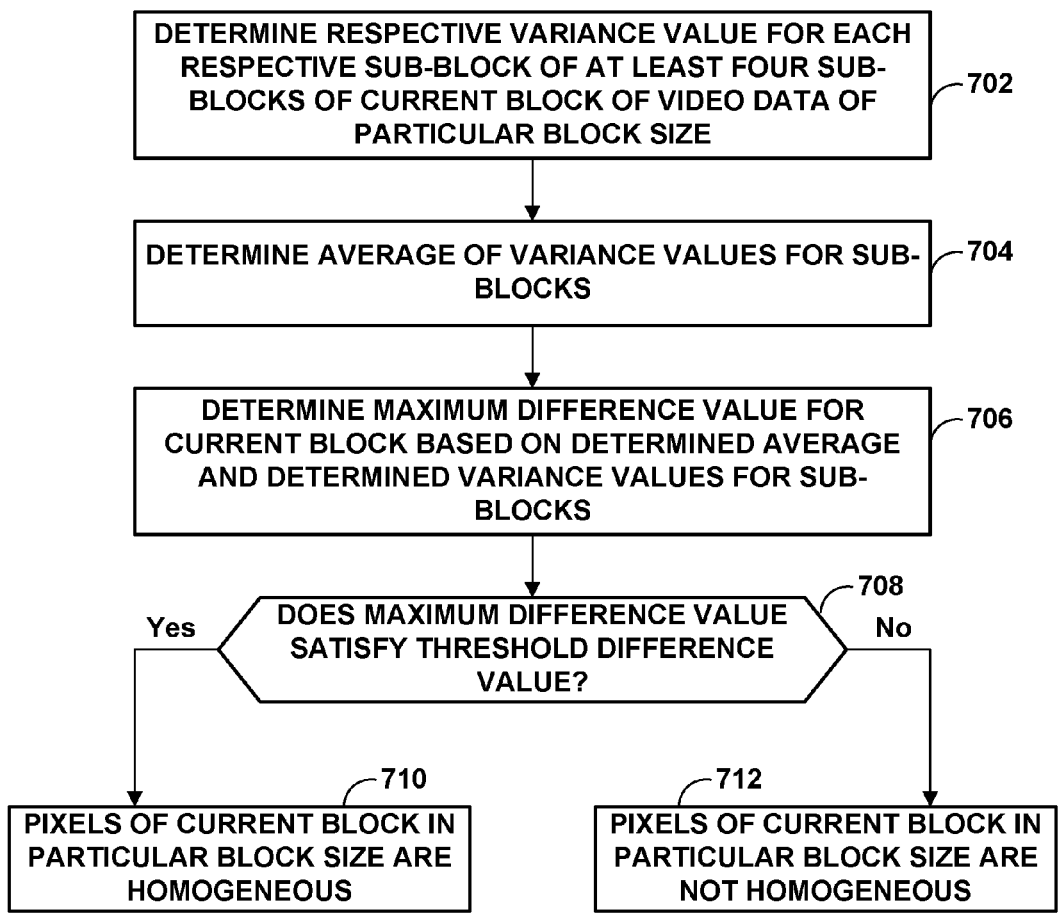
FIG. 7 is a flow diagram illustrating example operations of a video encoder to determine whether pixels of a block of video data of a particular block size are homogeneous, in accordance with one or more techniques of the disclosure.

FIG. 7 is a flow diagram illustrating example operations of a video encoder to determine whether pixels of a block of video data of a particular block size are homogeneous, in accordance with one or more techniques of the disclosure. The techniques of FIG. 7 may be performed by one or more video encoders, such as video encoder 20 illustrated in FIGS. 1 and 2. For purposes of illustration, the techniques of FIG. 7 are described within the context of video encoder 20, although video encoders having configurations different than that of video encoder 20 may perform the techniques of FIG. 7.

In accordance with one or more techniques of this disclosure, video encoder 20 may determine a respective variance value for each respective sub-block of at least four sub-blocks of a current block of video data of a particular block size of a plurality of block sizes (702). For instance, where the current block of video data is a 2N×2N block of video data, intra-prediction unit 48 may divide the current block of video data into four N×N blocks of video data (e.g., left top, left bottom, right top, and right bottom), and determine four variance values, $Var_{N \times N,1}$ to $Var_{N \times N,4}$.

Video encoder 20 may determine an average of the determined variance values for the at least four sub-blocks (704). For instance, intra-prediction unit 48 of FIG. 2 may determine the average of the four variance values, $Var_{N \times N,1}$ to $Var_{N \times N,4}$.

Video encoder 20 may determine a maximum difference value for the current block based on the determined average and the determined variance values for the at least four sub-blocks (706). For instance, intra-prediction unit 48 may determine the maximum difference value in accordance with Equation (1), above.

Video encoder 20 may determine whether the maximum difference value satisfies a threshold difference value (708). For instance, intra-prediction unit 48 may determine that the maximum difference value satisfies the threshold difference value when the maximum difference value is less than the threshold difference value.

When the maximum difference value satisfies the threshold difference value ("Yes" branch of 708), video encoder 20 may determine that the pixels of the current block in the particular block size are homogeneous (710). When the maximum difference value does not satisfy the threshold difference value ("No" branch of 708), video encoder 20 may determine that the pixels of the current block in the particular block size are not homogeneous (712).

In some examples, in addition to the maximum difference value, video encoder 20 may determine whether the pixels of the current block in the particular block size are homogeneous based on one or more other parameters. As one example, video encoder 20 may determine whether the pixels of the current block in the particular block size are homogeneous based on DPCM information of pixels of the current block, and/or a variance value of the pixels of the current block. For instance, as discussed above, video encoder 20 may determine whether the pixels of the current block in the particular block size are homogeneous based on a vertical and horizontal SAD values.

Certain aspects of this disclosure have been described with respect to the HEVC standard for purposes of illustration. However, the techniques described in this disclosure may be useful for other video coding processes, including other standard or proprietary video coding processes not yet developed, such as the H.266 video coding standard currently in development.

For instance, the techniques of this disclosure may be applied to other block based video encoders, such as AVC, VP8, and VP9. For example in AVC, the biggest CU size may be 16×16, and possible block partition sizes include 16×16, 8×8, and 4×4. In one example, the number of different block partition sizes to check during RD optimization may be reduced to two in accordance with the techniques of this disclosure. For instance, a video encoder may first determine whether pixels in an 8×8 block size of a 16×16 CU are homogeneous. If the pixels in the 8×8 block size of the 16×16 CU are homogeneous, the video encoder may evaluate a 16×16 block size (i.e., a 16×16 prediction unit size) and the 8×8 block size (i.e., a 8×8 prediction unit size) for use when intra encoding pixels of the CU. If the pixels in the 8×8 block size of the 16×16 CU are not homogeneous, the video encoder may evaluate the 8×8 block size and a 4×4 block size (i.e., a 4×4 prediction unit size) for use when intra encoding pixels of the CU.

A video coder, as described in this disclosure, may refer to a video encoder or a video decoder. Similarly, a video coding unit may refer to a video encoder or a video decoder. Likewise, video coding may refer to video encoding or video decoding, as applicable.

The following numbered examples may illustrate one or more aspects of the disclosure:

Example 1

A method for encoding video data, the method comprising: determining, by a video encoder, a respective variance value for pixels of each respective sub-block of at least four sub-blocks of a current block of video data of a particular block size of a plurality of block sizes; determining, by the video encoder, an average of the determined variance values for the at least four sub-blocks; determining, by the video encoder, a maximum difference value for the current block based on the determined average and the determined variance values for the at least four sub-blocks; determining, by the video encoder, whether pixels of the current block are homogeneous based on whether the maximum difference value for the current block satisfies a threshold difference value; in response to determining that the pixels of the current block are homogeneous, selectively including, by the video encoder, block sizes of the plurality of block sizes that are greater than or equal to a threshold block size of the plurality of block sizes in a sub-set of block sizes to evaluate for use when intra encoding the pixels of the current block; and evaluating block sizes in the sub-set of block sizes for use when intra encoding the pixels of the current block.

Example 2

The method of example 1, wherein the threshold block size is a first threshold block size, the method further comprising: in response to determining that the pixels of the current block are not homogeneous, including block sizes of the plurality of block sizes that are less than or equal to a second threshold block size of the plurality of block sizes in the sub-set of block sizes to evaluate for use when intra encoding the pixels of the current block.

Example 3

The method of example 2, wherein the first threshold block size equals the second threshold block size.

Example 4

The method of example 2, wherein the first threshold block size is different than the second threshold block size.

Example 5

The method of any combination of examples 1-4, wherein the threshold block size is a first threshold block size, the method further comprising, in response to determining that the pixels of the current block in the particular block size are not homogeneous: dividing a current sub-block of the at least four sub-blocks of video data into at least four second sub-blocks of video data; determining a respective variance value for each respective second sub-block of the at least four second sub-blocks; determining an average of the determined variance values for the at least four second sub-blocks; determining a maximum difference value for the current sub-block based on the determined average and the determined variance values for the at least four second sub-blocks; determining, based on the maximum difference value for the current sub-block, whether pixels of the current sub-block are homogeneous; and in response to determining that the pixels of the current sub-block are homogeneous, including block sizes of the plurality of block sizes that are greater than or equal to a second threshold block size of the plurality of block sizes but less than the first threshold block size in a sub-set of block sizes to evaluate for use when intra encoding the pixels of the current sub-block.

Example 6

The method of any combination of examples 1-5, further comprising: in response to determining that the pixels of the current sub-block are not homogeneous, including block sizes of the plurality of block sizes that are less than or equal to a third threshold block size of the plurality of block sizes in the sub-set of block sizes to evaluate for use when intra encoding the pixels of the current sub-block.

Example 7

The method of any combination of examples 1-6, further comprising: determining, for the current block, a horizontal sum of absolute differences (SAD) value using a first pixel in each respective row of the current block as a predictor for the respective row; determining, for the current block, a vertical SAD value using a first pixel in each respective column of the current block as a predictor for the respective column, wherein the determination of whether the pixels of the current block are homogeneous is further based on whether a lesser of the horizontal SAD value and the vertical SAD value satisfies a threshold SAD value.

Example 8

The method of any combination of examples 1-7, further comprising: determining a variance value for the current block, wherein the determination of whether the pixels of the current block are homogeneous is further based on whether the variance value for the current block satisfies a threshold variance value.

Example 9

The method of any combination of examples 1-8, wherein determining whether the pixels of the current block are homogeneous comprises determining that the pixels of the current block are homogeneous in response to determining that: the maximum difference value for the current block is less than the threshold difference value, the lesser of the horizontal SAD value and the vertical SAD value is less than the threshold SAD value, or the variance value for the current block is less than the threshold variance value.

Example 10

The method of any combination of examples 1-9, wherein the threshold difference value, the threshold SAD value, and the threshold variance value are fixed.

Example 11

The method of any combination of examples 1-9, further comprising: adaptively determining one or more of the threshold difference value, the threshold SAD value, and the threshold variance value.

Example 12

The method of any combination of examples 1-11, wherein evaluating the block sizes in the sub-set of block sizes comprises: determining a respective rate-distortion (RD) cost for each respective block size in the sub-set of block sizes, the method further comprising: encoding, in a coded video bitstream, an indication that at least a portion of the pixels of the current block are intra encoded using the block size in the sub-set of block sizes with the lowest RD cost.

Example 13

The method of any combination of examples 1-12, wherein selectively including the block sizes of the plurality of block sizes that are greater than or equal to a threshold block size of the plurality of block sizes in a sub-set of block sizes to evaluate for use when intra encoding the pixels of the current block further comprises not including block sizes of the plurality of block sizes that are less than the threshold block size in the sub-set of block sizes to evaluate for use when intra encoding the pixels of the current block.

Example 14

The method of any combination of examples 1-12, further comprising: in response to determining that the pixels of the current block are homogeneous, not including block sizes of the plurality of block sizes that are less than the threshold block size in the sub-set of block sizes to evaluate for use when intra encoding the pixels of the current block.

Example 15

A video encoding device comprising: a memory configured to store a current block of video data; and one or more processors configured to perform any combination of the method of examples 1-14.

Example 16

A video encoding device comprising means for performing any combination of the method of examples 1-14.

Example 17

A computer-readable storage medium storing instructions that, when executed by one or more processors of a video encoder, cause the one or more processors to perform any combination of the method of examples 1-14.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol.

In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium.

It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for encoding video data, the method comprising:
   determining, by a video encoder, a respective variance value for pixels of each respective sub-block of at least four sub-blocks of a current block of video data of a particular block size of a plurality of block sizes, wherein the current block of video data is included in a current picture of video data that includes a plurality of other blocks of video data;
   determining, by the video encoder, an average of the determined variance values for the at least four sub-blocks;
   determining, by the video encoder, a maximum difference value for the current block as a largest absolute difference between a variance value of each sub-block of the at least four sub-blocks and the determined average;
   determining, by the video encoder, that the pixels of the current block are homogeneous based on the maximum difference value for the current block being less than a threshold difference value;
   in response to determining that the pixels of the current block are homogeneous, selectively including, by the video encoder, block sizes of the plurality of block sizes that are greater than or equal to a threshold block size of the plurality of block sizes in a sub-set of block sizes to evaluate for use when intra encoding the pixels of the current block; and
   evaluating block sizes in the sub-set of block sizes for use when intra encoding the pixels of the current block.

2. The method of claim 1, wherein the threshold block size is a first threshold block size, the method further comprising:
   determining, by the video encoder, that pixels of another block are not homogeneous if a maximum difference value for the other block is not less than the threshold difference value; and
   in response to determining that the pixels of the other block are not homogeneous, selectively including block sizes of the plurality of block sizes that are less than or equal to a second threshold block size of the plurality of block sizes in a sub-set of block sizes to evaluate for use when intra encoding the pixels of the other block.

3. The method of claim 2, wherein the first threshold block size equals the second threshold block size.

4. The method of claim 2, wherein the first threshold block size is different than the second threshold block size.

5. The method of claim 1, wherein the threshold block size is a first threshold block size, the method further comprising, in response to determining that the pixels of the current block in the particular block size are not homogeneous:
   dividing a current sub-block of the at least four sub-blocks of video data into at least four second sub-blocks of video data;
   determining a respective variance value for each respective second sub-block of the at least four second sub-blocks;
   determining an average of the determined variance values for the at least four second sub-blocks;
   determining a maximum difference value for the current sub-block based on the determined average and the determined variance values for the at least four second sub-blocks;
   determining, based on the maximum difference value for the current sub-block, whether pixels of the current sub-block are homogeneous; and
   in response to determining that the pixels of the current sub-block are homogeneous, selectively including block sizes of the plurality of block sizes that are greater than or equal to a second threshold block size of the plurality of block sizes but less than the first threshold block size in a sub-set of block sizes to evaluate for use when intra encoding the pixels of the current sub-block.

6. The method of claim 5, further comprising:
   in response to determining that the pixels of the current sub-block are not homogeneous, selectively including block sizes of the plurality of block sizes that are less than or equal to a third threshold block size of the plurality of block sizes in the sub-set of block sizes to evaluate for use when intra encoding the pixels of the current sub-block.

7. The method of claim 1, further comprising:
   determining, for the current block, a horizontal sum of absolute differences (SAD) value using a first pixel in each respective row of the current block as a predictor for the respective row;
   determining, for the current block, a vertical SAD value using a first pixel in each respective column of the current block as a predictor for the respective column,
   wherein the determination of whether the pixels of the current block are homogeneous is further based on whether a lesser of the horizontal SAD value and the vertical SAD value satisfies a threshold SAD value.

8. The method of claim 7, further comprising:
   determining a variance value for the current block,
   wherein the determination of whether the pixels of the current block are homogeneous is further based on whether the variance value for the current block satisfies a threshold variance value.

9. The method of claim 8, wherein determining whether the pixels of the current block are homogeneous comprises determining that the pixels of the current block are homogeneous in response to determining that:
   the maximum difference value for the current block is less than the threshold difference value,
   the lesser of the horizontal SAD value and the vertical SAD value is less than the threshold SAD value, or
   the variance value for the current block is less than the threshold variance value.

10. The method of claim 8, wherein the threshold difference value, the threshold SAD value, and the threshold variance value are fixed.

11. The method of claim 8, further comprising:
    adaptively determining one or more of the threshold difference value, the threshold SAD value, and the threshold variance value.

12. The method of claim 1, wherein evaluating the block sizes in the sub-set of block sizes comprises:
    determining a respective rate-distortion (RD) cost for each respective block size in the sub-set of block sizes, the method further comprising:
    encoding, in a coded video bitstream, an indication that at least a portion of the pixels of the current block are intra encoded using the block size in the sub-set of block sizes with the lowest RD cost.

13. A video encoding device comprising:
    a memory configured to store a current block of video data; and
    one or more processors configured to:
    determine a respective variance value for pixels of each respective sub-block of at least four sub-blocks of the current block of video data of a particular block size of a plurality of block sizes, wherein the current block of video data is included in a current picture of video data that includes a plurality of other blocks of video data;
determine an average of the determined variance values for the at least four sub-blocks;
determine a maximum difference value for the current block as a largest absolute difference between a variance value of each sub-block of the at least four sub-blocks and the determined average;
determine that the pixels of the current block are homogeneous if the maximum difference value for the current block is less than a threshold difference value;
selectively include, in response to determining that the pixels of the current block are homogeneous, block sizes of the plurality of block sizes that are greater than or equal to a threshold block size of the plurality of block sizes in a sub-set of block sizes to evaluate for use when intra encoding the pixels of the current block; and
evaluate block sizes in the sub-set of block sizes for use when intra encoding the pixels of the current block.

14. The video encoding device of claim 13, wherein the threshold block size is a first threshold block size, and wherein the one or more processors are further configured to:
determine that the pixels of the current block are not homogeneous if the maximum difference value for the current block is not less than the threshold difference value; and
selectively include, in response to determining that the pixels of the current block are not homogeneous, block sizes of the plurality of block sizes that are less than or equal to a second threshold block size of the plurality of block sizes in the sub-set of block sizes to evaluate for use when intra encoding the pixels of the current block.

15. The video encoding device of claim 13, wherein the threshold block size is a first threshold block size, and wherein, in response to determining that the pixels of the current block in the particular block size are not homogeneous, the one or more processors are configured to:
divide a current sub-block of the at least four sub-blocks of video data into at least four second sub-blocks of video data;
determine a respective variance value for each respective second sub-block of the at least four second sub-blocks;
determine an average of the determined variance values for the at least four second sub-blocks;
determine a maximum difference value for the current sub-block based on the determined average and the determined variance values for the at least four second sub-blocks;
determine, based on the maximum difference value for the current sub-block, whether pixels of the current sub-block are homogeneous; and
selectively include, in response to determining that the pixels of the current sub-block are homogeneous, block sizes of the plurality of block sizes that are greater than or equal to a second threshold block size of the plurality of block sizes but less than the first threshold block size in a sub-set of block sizes to evaluate for use when intra encoding the pixels of the current sub-block.

16. The video encoding device of claim 15, wherein the one or more processors are further configured to:

selectively include, in response to determining that the pixels of the current sub-block are not homogeneous, block sizes of the plurality of block sizes that are less than or equal to a third threshold block size of the plurality of block sizes in the sub-set of block sizes to evaluate for use when intra encoding the pixels of the current sub-block.

17. The video encoding device of claim 13, wherein the one or more processors are further configured to:
determine, for the current block, a horizontal sum of absolute differences (SAD) value using a first pixel in each respective row of the current block as a predictor for the respective row;
determine, for the current block, a vertical SAD value using a first pixel in each respective column of the current block as a predictor for the respective column,
wherein the determination of whether the pixels of the current block are homogeneous is further based on whether a lesser of the horizontal SAD value and the vertical SAD value satisfies a threshold SAD value.

18. The video encoding device of claim 17, wherein the one or more processors are further configured to:
determine a variance value for the current block,
wherein the determination of whether the pixels of the current block are homogeneous is further based on whether the variance value for the current block satisfies a threshold variance value.

19. The video encoding device of claim 18, wherein the one or more processors are configured to determine that the pixels of the current block are homogeneous in response to determining that:
the maximum difference value for the current block is less than the threshold difference value,
the lesser of the horizontal SAD value and the vertical SAD value is less than the threshold SAD value, or
the variance value for the current block is less than the threshold variance value.

20. A non-transitory computer-readable storage medium storing instructions that, when executed by one or more processors of a video encoder, cause the one or more processors to:
determine a respective variance value for pixels of each respective sub-block of at least four sub-blocks of a current block of video data of a particular block size of a plurality of block sizes, wherein the current block of video data is included in a current picture of video data that includes a plurality of other blocks of video data;
determine an average of the determined variance values for the at least four sub-blocks;
determine a maximum difference value for the current block as a largest absolute difference between a variance value of each sub-block of the at least four sub-blocks and the determined average;
determine that the pixels of the current block are homogeneous if the maximum difference value for the current block is less than a non-zero threshold difference value;
selectively include, in response to determining that the pixels of the current block are homogeneous, block sizes of the plurality of block sizes that are greater than or equal to a threshold block size of the plurality of block sizes in a sub-set of block sizes to evaluate for use when intra encoding the pixels of the current block; and evaluate block sizes in the sub-set of block sizes for use when intra encoding the pixels of the current block.

\* \* \* \* \*